US007330486B2

United States Patent
Ko et al.

(10) Patent No.: US 7,330,486 B2
(45) Date of Patent: Feb. 12, 2008

(54) INTERNET PROTOCOL BASED COMMUNICATION SYSTEM AND METHOD FOR SETTING HOST ADDRESS AND SELECTING SOURCE ADDRESS THEREIN

(75) Inventors: Eun-Sook Ko, Anyang-shi (KR); Young-Seop Han, Songnam-shi (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 1038 days.

(21) Appl. No.: 10/387,794

(22) Filed: Mar. 14, 2003

(65) Prior Publication Data

US 2003/0204635 A1     Oct. 30, 2003

(30) Foreign Application Priority Data

Apr. 27, 2002  (KR) ............................... 2002-23206

(51) Int. Cl.
   *H04J 3/24*    (2006.01)
(52) U.S. Cl. .................. 370/475; 709/238; 709/250
(58) Field of Classification Search .............. 370/389, 370/474, 395.53, 254, 401, 392, 463, 352, 370/386, 255, 395.32, 400, 351, 409, 475, 370/356; 709/250, 238; 711/216, 221, 2
   See application file for complete search history.

(56) References Cited

U.S. PATENT DOCUMENTS 5,546,387 A * 8/1996 Larsson et al. ............. 370/392
6,526,055 B1 * 2/2003 Chiu et al. ................. 370/392
6,959,009 B2 * 10/2005 Asokan et al. ............. 370/475
7,039,018 B2 * 5/2006 Singh et al. ................ 370/255
7,061,911 B2 * 6/2006 Furuno ...................... 370/392

(Continued)

FOREIGN PATENT DOCUMENTS

JP       2000-324172       11/2000

(Continued)

OTHER PUBLICATIONS

D. Johnson et al.; "Mobility Support in IPv6;" IETF Mobile IP Working Group; Mar. 22, 2002; http://www.watersprings.org/pub/id/draft-ietf-mobileip-ipv6-16.txt.

(Continued)

*Primary Examiner*—Chi Pham
*Assistant Examiner*—Alexander O. Boakye
(74) *Attorney, Agent, or Firm*—Cha & Reiter, LLC

(57) ABSTRACT

A method for setting a host address in an Internet protocol based communication system, includes the steps of allowing a router to create a shorter label than a network prefix, the label being representative of the network prefix; allowing the router to incorporate the label instead of the network prefix in an RA (Router Advertisement) message and transmit the RA message to a host; allowing the host receiving the RA message to read the label and determine whether the read label matches a label in a prefix information table of the host; and, if the read label matches a label in the prefix information table, allowing the host to select and activate an interface ID (identifier) corresponding to the label of the prefix information table and acquire a global IPv6 (Internet Protocol, version 6) address corresponding to the activated interface ID as the host address.

10 Claims, 12 Drawing Sheets

| interface | network prefix | global IPv6 address |
|---|---|---|
| L1 | 3ffe:2e01:2:1::/64 | 3ffe:2e01:2:1:02:90:27:ff:fe:17:fc:0f |
| L2 | 3ffe:2e01:2:2::/64 | 3ffe:2e01:2:2:02:90:27:ff:fe:17:fc:0f |
| L3 | 3ffe:2e01:2:3::/64 | 3ffe:2e01:2:3:02:90:27:ff:fe:17:fc:0f |
| L4 | 3ffe:2e01:2:4::/64 | 3ffe:2e01:2:4:02:90:27:ff:fe:17:fc:0f |
| L5 | 3ffe:2e01:2:5::/64 | 3ffe:2e01:2:5:02:90:27:ff:fe:17:fc:0f |
| L6 | 3ffe:2e01:2:6::/64 | 3ffe:2e01:2:6:02:90:27:ff:fe:17:fc:0f |

U.S. PATENT DOCUMENTS 7,123,599 B2 * 10/2006 Yano et al. ................. 370/331

FOREIGN PATENT DOCUMENTS

WO        WO 01/74108        10/2001

OTHER PUBLICATIONS

Internet Draft, C. Huitema and R. Draves, Jul. 12, 2001, Microsoft, "Host-Centric IPv6 Multihoming", pp. 1-24.
Internet Draft, Richard Draves, Sep. 28, 2001, Microsoft, Default Address Selection For IPv6, pp. 1-27.
S. Deering and R. Hinden, Cisco and Nokia, Dec. 1998, Internet Protocol, Version 6 (IPv6) Specification, pp. 1-39.
S. Thomson and T. Narten; Bellcore and IBM, Dec. 1998, "IPv6 Stateless Address Autoconfiguration".
T. Narten, E. Nordmark and W. Simpson; IBM Sun Microsystems and Daydreamer; Dec. 1998; pp. 1-93.
"IPv6—The Technology of Dynamic Address Management in IPv6;" Zeng Bin et al.; Computer of Engineering and Science, vol. 22, No. 1; Jan. 22, 2000; 4 pages.
"Study on Fast Address-Lookup Scheme and Implementations Techniques for High-Speed Routers;" She Xiao-Xuan; Journal of China Institute of Communications, vol. 22, No. 7; Jul. 2001; 5 pages.
S. Thomson et al.; "IPv6 Stateless Address Autoconfiguration;" Network Working Group RFC 2462; Dec. 1998; XP015008246; 26 pgs.
T. Narten et al.; "Neighbor Discovery for IP Version 6 (IPv6);" Network Working Group RFC1970; Dec. 1998; XP015008245; 93 pgs.

* cited by examiner

| interface | network prefix | global IPv6 address |
|---|---|---|
| L1 | 3ffe:2e01:2:1::/64 | 3ffe:2e01:2:1:02:90:27:ff:fe:17:fc:0f |
| L2 | 3ffe:2e01:2:2::/64 | 3ffe:2e01:2:2:02:90:27:ff:fe:17:fc:0f |
| L3 | 3ffe:2e01:2:3::/64 | 3ffe:2e01:2:3:02:90:27:ff:fe:17:fc:0f |
| L4 | 3ffe:2e01:2:4::/64 | 3ffe:2e01:2:4:02:90:27:ff:fe:17:fc:0f |
| L5 | 3ffe:2e01:2:5::/64 | 3ffe:2e01:2:5:02:90:27:ff:fe:17:fc:0f |
| L6 | 3ffe:2e01:2:6::/64 | 3ffe:2e01:2:6:02:90:27:ff:fe:17:fc:0f |

FIG.10

| router_label | Interface_Id | lifetime |
|---|---|---|
| | | |

FIG.11

| Field name | Description |
|---|---|
| router_label | HOST (NODE) STORES LABEL OF RECEIVED PACKET |
| Interface_Id | HOST (NODE) SETS GLOBAL IPv6 ADDRESS TO ONE OF SEVERAL INTERFACES AND STORES SET INTERFACE ID |
| lifetime | HOST (NODE) COPIES AND STORES ROUTER LIFETIME VALUE OF RA MESSAGE |

FIG.12

| router_label | Interface_Id | lifetime |
|---|---|---|
| 578 | L1 | 1200 |
| 421 | L2 | 600 |
| 798 | L3 | 1800 |
| 254 | L4 | 36000 |
| 1012 | L5 | 60 |
| 23 | L6 | 64000 |

FIG.13

```
Packet_IPv6                 (length:96)
    Header_IPv6             (length:40)(IPv6 basic header)
        Version             =6
        TrafficClass        =0
        FlowLabel           =0
        PayloadLength       =56
        NextHeader          =58(ICMP message type)
        HopLimit            =255
        SourceAddress       =fe80::204:76ff:fe72:3c56
        DestinationAddress  =ff02::1
    ICMPv6_RA               (length:56)
        Type                =134(RA message type)
        Code                =0
        Checksum            =21438 calc(21483)
        CurHopLimit         =64
        MFlag               =0
        OFlag               =0
        HFlag               =0
        Reserved            =0
        LifeTime            =1800
        ReachableTime       =0
        RetransTimer        =0
        Opt_ICMPv6_sll      (length:8)(option part)
            Type            =1(Source Link-Layer address option type)
            Length          =1
            LinkLayerAddress =0:4:76:72:3c:56
        Opt_ICMPv6_Prefix   (length:32)(option part)
            Type            =3(Prefix Information option type)
            Length          =4
            PrefixLength    =64
            LFlag           =1
            AFlag           =1
            RFlag           =0
            Reserved1       =0
            ValidLifeTime   =2592000
            PreferredLifeTime =604800
            Reserved2       =0
            Prefix          =3ffe:2e01:2:4::
```

FIG.17

INTERNET PROTOCOL BASED COMMUNICATION SYSTEM AND METHOD FOR SETTING HOST ADDRESS AND SELECTING SOURCE ADDRESS THEREIN

CLAIM OF PRIORITY

This application claims priority from an application entitled "INTERNET PROTOCOL BASED COMMUNICATION SYSTEM AND METHODS FOR SETTING HOST ADDRESS AND SELECTING SOURCE ADDRESS THEREIN", filed in the Korean Industrial Property Office on Apr. 27, 2002 and assigned Serial No. 2002-23206, the contents of which are hereby incorporated by reference.

BACKGROUND OF THE INVENTION

1. Field of the Invention

The present invention relates to a communication system, and more particularly to an IPv6 (Internet Protocol, version 6) based communication system and method for setting an address and selecting a source address effectively when an IPv6 based host (node) moves between host networks.

2. Description of the Related Art

In a Request for Comments (RFC) 2460 (Obsoletes: 1883) standard, an IPv6 (Internet Protocol, version 6) supports mobility by itself. In the IPv6 specification, a global address can be directly created through ND (Neighbor Discovery), AAC (Address Auto-Configuration) and DAD (Duplicate Address Detection) mechanisms. In other words, IPv6 accommodates the concept of a mobile Internet protocol associated with a home network, HA (Home Agent), CoA (Care of Address), etc. All hosts should support the AAC and ND mechanisms. These mechanisms are outlined below.

ND Mechanism

The ND mechanism is directed to an ARP (Address Resolution Protocol) in IPv4 (Internet Protocol, version 4) and is a protocol for identifying network topology variations and measuring link states. The ND mechanism retains reachable information on paths linked to neighbor nodes being activated and identifies circumferential routers and prefix information. There are five ND related messages including an RA (Router Advertisement) message to be used for identifying whether there is another router attached to the same link as a router's link, an RS (Router Solicitation) message, an NS (Neighbor Solicitation) message for performing the same function as the ARP in IPv4, an NA (Neighbor Advertisement) message, and a redirect message to be used in the case that the router recognizes a better path. The router transfers its own prefix information to its circumferential hosts through the RA message.

AAC Mechanism

The AAC mechanism automatically creates a routable address and automatically sets a default router with a "Plug-and-Play" function of IPv6 that does not require assigning an address to a host. The AAC mechanism is an optional mechanism using the ND mechanism described above. The AAC mechanism can provide many advantages in that it configures and manages a network by identifying a prefix, default router and address duplication.

An IPv6 address is configured as shown in FIG. 1. Referring to FIG. 1, the IPv6 address is made up of a network prefix of n out of 128 bits and an interface identified (ID) having (128−n) bits.

FIG. 2 is a view explaining an address auto-configuration procedure. A procedure of creating a global IPv6 address is now described below with reference to FIG. 2. First, the lower-order 64 bits in the global IPv6 address are configured using a 48-bit MAC (Media Access Control) address of 128 bits. In IPv6 on the Internet, the interface ID represents an EUI-64 based interface It). More specifically, a lower-order 64-bit interface ID "02:90:27:ff:fe:17:fc:0f" of the global IPv6 address is acquired by adding the 2-bytes "ff:fe" in the middle of a 48-bit MAC address "00:90:27:17:fc:0f" and setting a seventh bit b1 from a highest-order bit located within a highest-order byte "00" to "1". The seventh bit b1 from the highest-order bit located within the highest-order byte "00" represents a U/L (Universal/Local) bit for indicating a unique address. The lower-order 64-bit interface ID "02:90:27:ff:fe:17:fc:0f" described above is the same as that shown in FIG. 3 and an Interface ID for an IPv6 address shown in FIG. 1.

Referring now to FIG. 4, an example of the AAC mechanism is described as follows. In FIG. 4, an Internet ID of a host 40 is "250:daff:fe93:af5e" and a network prefix, which is received from the router 42 and carried by the RA message of the ND, is "3ffe:2e01:2:1::/48". In other words, the host 40 configures its own IPv6 address through the AAC mechanism and the configured IPv6 address is "3ffe:2e01:2:1:250:daff:fe93:af5e".

As shown in FIG. 5, when an IPv6 based host 50 moves from a network A 54 including a router A 52 to a network B 56 including a router B 58, it identifies an operating state of a link using the ND mechanism and receives the RA message from the router B 58 included in the network B 56. Here, the network can be a small-scale sub-network or a large-scale sub-network capable of being managed by one router. In other words, the network means a range in which one router can advertise the network prefix. Further, the host 50 configures its own IPv6 address through network prefix information and the AAC mechanism. At this time, the host 50 can transmit the RS message to the router B 58 before it receives the RA message.

As described above, an IPv6 based host waits for an RA message for a predetermined time interval immediately after moving from one network to another network in order to configure a global IPv6 address. If the IPv6 based host fails to receive the RA message after the time interval, it transmits an RS message and receives the RA message. Thereafter, the IPv6 based host configures its own address using the AAC mechanism.

However, the IPv6 based host conventionally needs various mechanisms and a lot of time to configure the address. When considering a mobile IPv6, a host incurs overhead due address configuration. Further, there is a problem when the IPv6 based host conventionally selects a source address. That is, when several IPv6 addresses are set for interfaces as a feature of IPv6, there is a significant problem arising from the difficult an IPv6 based host has in identifying which address should be selected as a source address.

SUMMARY OF THE INVENTION

Therefore, the present invention has been developed in view of the above problems, and it is an object of the present invention to provide an IPv6 (Internet Protocol, version 6) based communication system and method for setting an address and selecting a source address effectively when an IPv6 based host moves between host networks.

It is another object of the present invention to provide an address selection method capable of reducing the overhead of address setting by minimizing the time needed to configure a global IPv6 address.

It is another object of the present invention to provide an address selection method for activating only an optimum interface after setting several addresses to virtual interfaces.

It is yet another object of the present invention to provide a method for reducing overhead due to period packet transmission over a network.

In accordance with an aspect of the present invention, the above and other objects can be accomplished by the provision of a method for setting a host address in an Internet protocol based communication system, comprising the steps of:

a) allowing a router to create a shorter label than a network prefix, the label being representative of the network prefix;

b) allowing the router to incorporate the label instead of the network prefix in an RA message and transmit the RA message to a host;

c) allowing the host receiving the RA message to read the label and determine whether the label read matches a label in a prefix information table of the host; and d) if the label read matches a label in the prefix information table, allowing the host to select and activate an interface ID corresponding to the label of the prefix information table and acquire a global IPv6 address corresponding to the activated interface ID as the host address.

BRIEF DESCRIPTION OF THE DRAWINGS

The above and other objects, features and advantages of the present invention can be more clearly understood from the following detailed description taken in conjunction with the accompanying drawings, in which:

FIG. 10 is an exemplary view showing six global addresses set to six virtual interfaces L1-L6 corresponding to a host;

FIG. 11 is a view showing a format of a prefix information table created and managed by a host in accordance with an embodiment of the present invention;

FIG. 12 a view explaining fields of the prefix information table shown in FIG. 11;

FIG. 13 is an exemplary view showing a prefix information table created and managed by a host;

FIG. 17 is a view showing a format for an IPv6 packet associated with an RA message.

DETAILED DESCRIPTION OF THE PREFERRED EMBODIMENTS

Now, preferred embodiments of the present invention are described in detail with reference to the annexed drawings. In the following description, a detailed description of known functions and configurations incorporated herein is omitted when not required to clarify the subject matter of the present invention.

An apparatus in accordance with an embodiment of the present invention comprises a host based on IPv6 and a router for supporting IPv6 and advertising a network prefix for configuring a global IPv6 address. In accordance with this embodiment of the present invention, a modified IPv6 stack being implemented as a multi-homed host, which can create a virtual interface and set an address to the virtual interface, is mounted in the host.

As described above, the embodiment of the present invention employs the concept of a multi-homed host. The multi-homed host represents any host having more than one network prefix. In other words, the multi-homed host represents a host, that is connected to several networks using virtual interfaces and then selects a proper (virtual) interface. This is based on the assumption that various Internet Service Providers (ISPs) can assign sufficient IPv6 addresses in the future. It is noted that the interface is a virtual interface rather than a physical interface of a node connected to a network.

Figure 6:
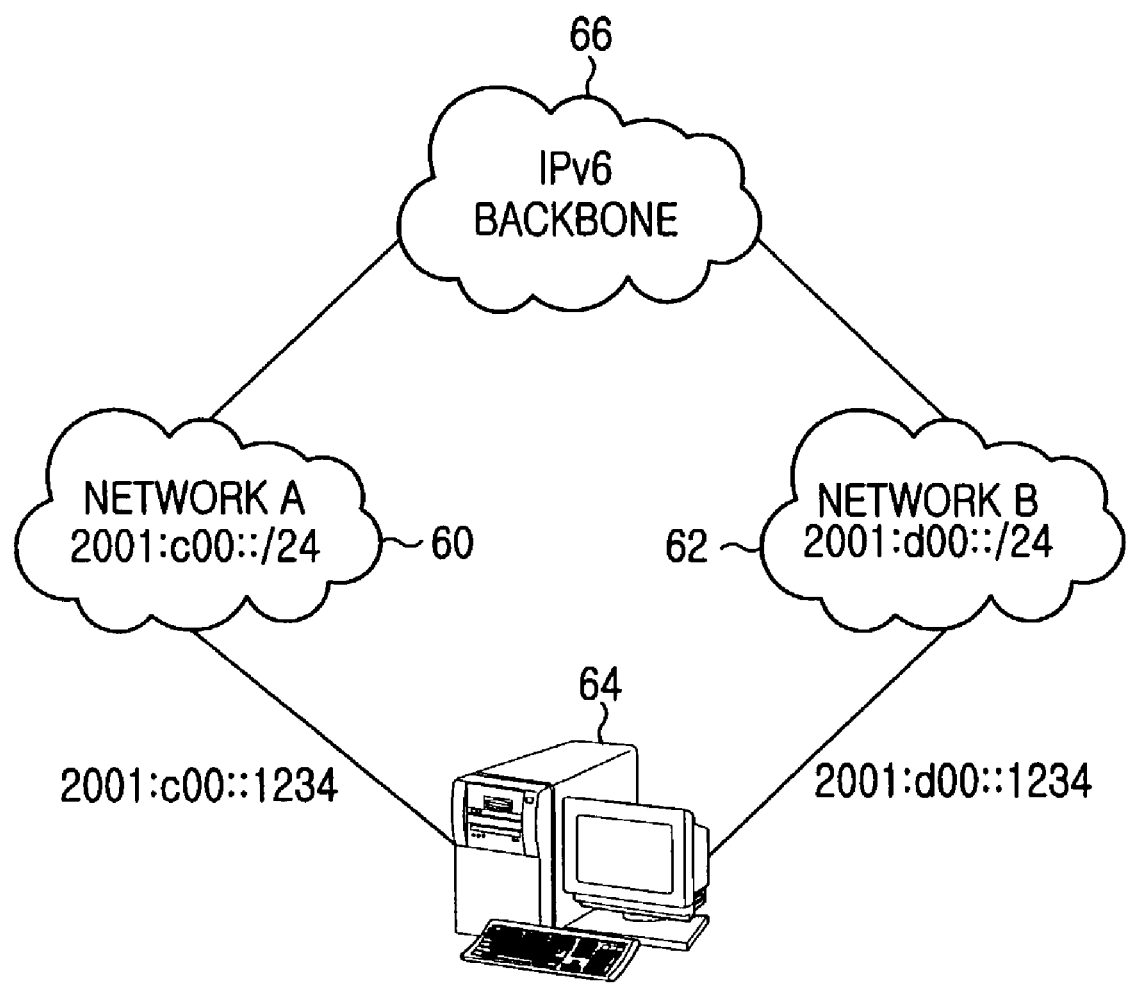
FIG. 6 is a view explaining a multi-homed host concept for effective routing in accordance with an embodiment of the present invention.

FIG. 6 is a view explaining a multi-homed host concept for effective routing in accordance with an embodiment of the present invention. In this embodiment, the multi-homed host can select one of several virtual interfaces for more effective routing. For example, a host 64 connected to two networks 60 and 62 shown in FIG. 6 receives network prefixes "2001:c00" and "2001:d00" from the networks 60 and 62, creates two virtual interfaces and sets addresses directed to the networks 60 and 62 corresponding to the virtual interfaces to "2001:c00::1234" and "2001:d00::1234". Further, the host 64 compares a prefix corresponding to a destination address with the prefixes corresponding to the virtual interfaces. Then, the host 64 selects an interface address corresponding to a prefix having a longest match as a basic address. In this embodiment, the host employs the modified IPv6 stack by which the multi-homed function is implemented.

Figure 7:
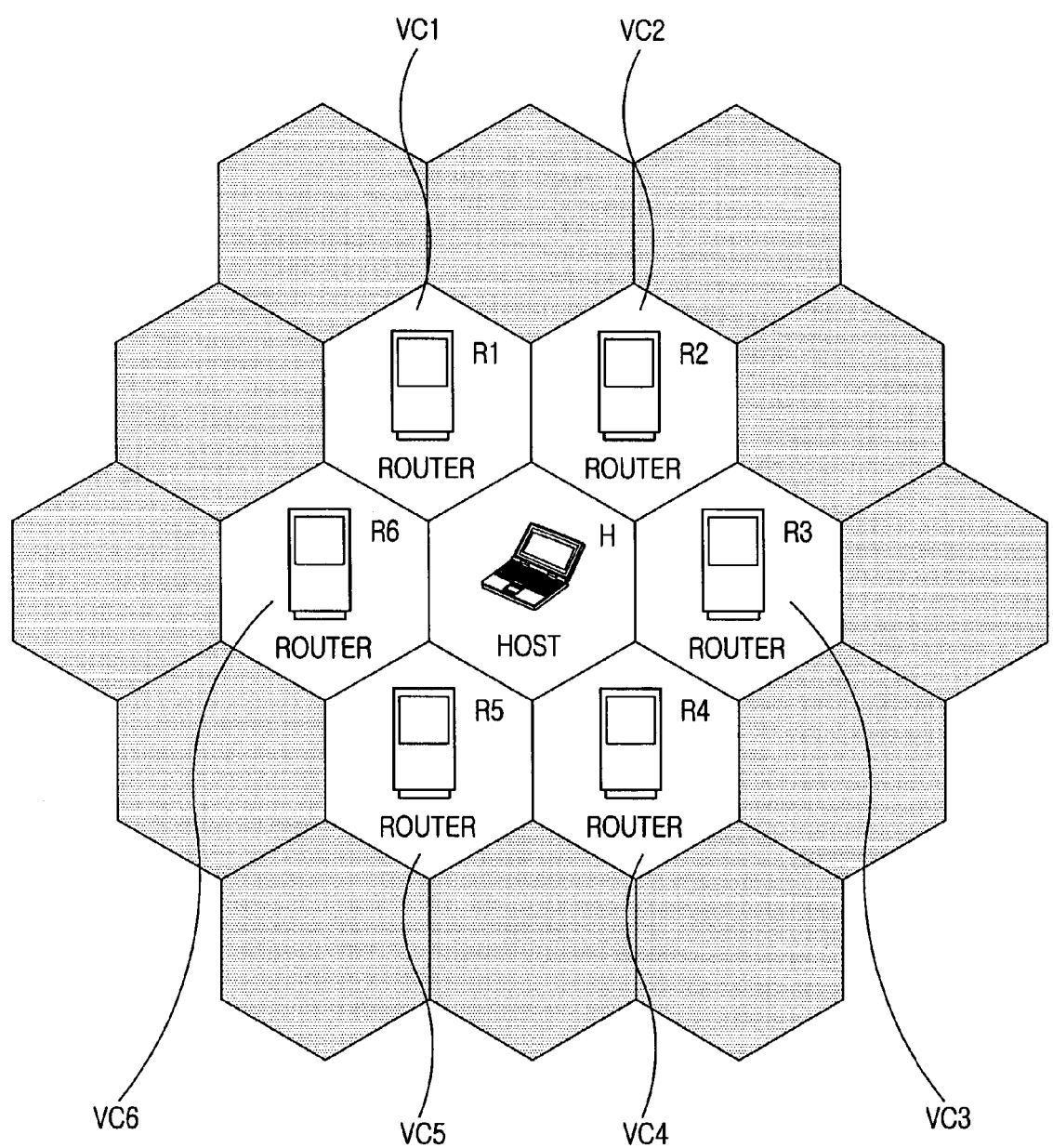
FIG. 7 is a view explaining a procedure of designating areas near a host as several Virtual Cells (VCs) to define an application range of a multi-homed function in accordance with an embodiment of the present invention.

FIG. 7 is a view explaining a procedure for designating areas near a host as several VCs to define an application range of a multi-homed function in accordance with another embodiment of the present invention. In this embodiment, the application range of the multi-homed function is defined by designating areas near a host H as several virtual cells VC1-VC6 as shown in FIG. 7. There are routers R1-R6 in the respective virtual cells VC1-VC6, which can transmit and manage network information corresponding to a cell area, respectively. In other words, one network corresponds to one network prefix in the respective virtual cells VC1-VC6. The host H configures a table by labeling network prefixes for the respective virtual cells VC1-VC6. Whenever the host H moves from one cell to another cell, it receives an RA message from a router placed in another cell.

Figure 8:
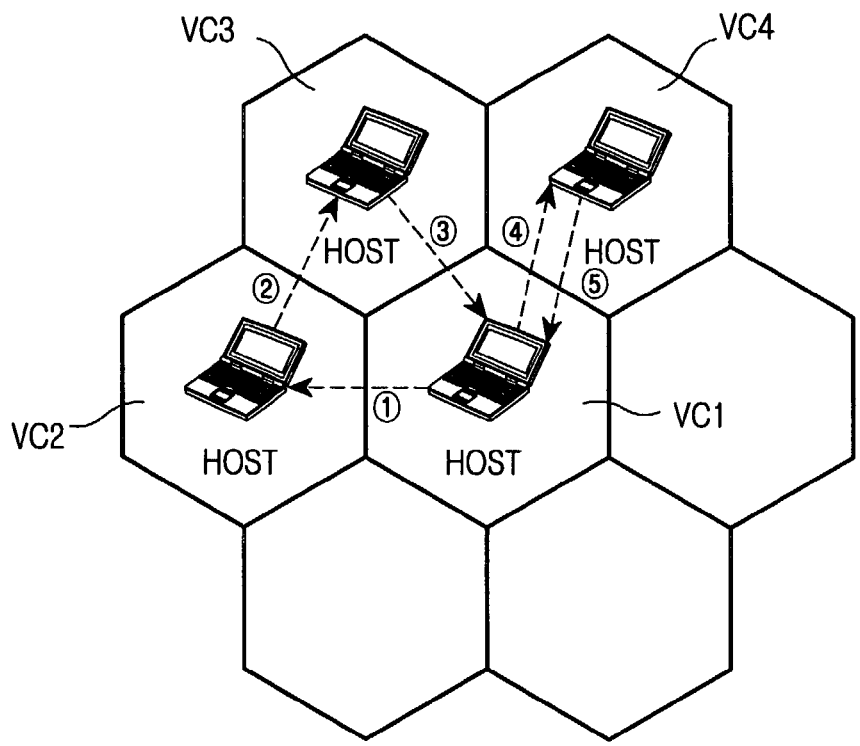
FIG. 8 is a view explaining the case when a host H moves beyond a boundary of virtual cells located at its own circumference.

Referring now to FIG. 8, when the HOST moves beyond a boundary of virtual cells located at its own circumference, i.e., when the HOST moves between cell positions 1→2→3→4→5, the HOST receives RA messages containing network prefixes from routers placed in the virtual cells VC2, VC3, VC4 and VC1, respectively. However, the case in which the HOST moves to the cell positions 4 and 5 represents the case in which the HOST revisits the virtual cell VC1 which it has previously visited. Accordingly, in this case, if the HOST retains global IPv6 address information configured by network prefixes corresponding to its own circumference cells, the HOST does not have to re-configure the global IPv6 addresses. In this embodiment, the HOST sets global IPv6 addresses, corresponding to different network prefixes, to several virtual interfaces L1, L2, L3, L4, L5 and L6 as described below with reference to FIG. 9. Thereafter, the HOST only selects an interface having a corresponding IPv6 address with respect to the cell VC1 being the previously visited network.

Figure 9:
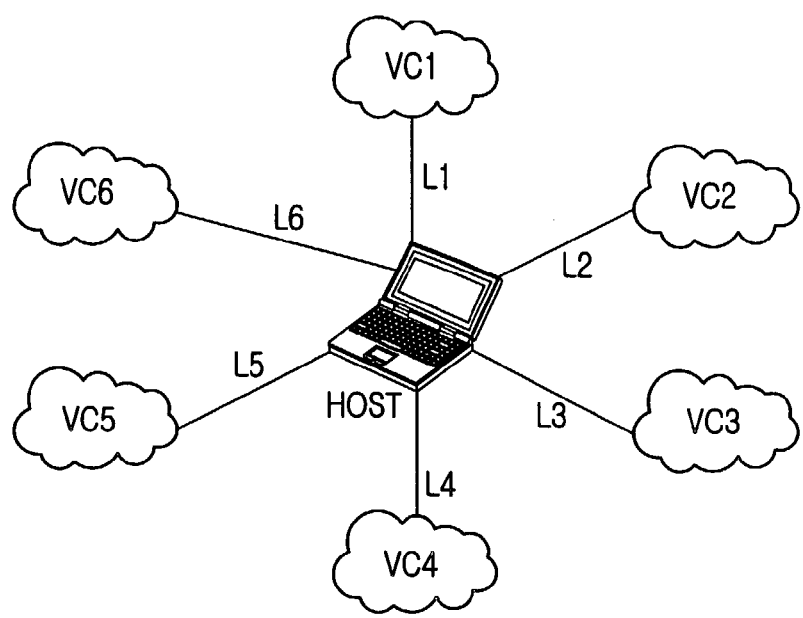
FIG. 9 is a view showing six virtual interfaces L1-L6 created in the host H corresponding to the VCs.

The six virtual interfaces set to the HOST are described with reference to FIG. 9. The HOST assigns the virtual interfaces L1-L6 to the virtual cells VC1-VC6. At this time, the HOST receives six network prefixes from respective routers belonging to the virtual cells VC1-VC6. Thereafter, the HOST configures six global IPv6 addresses corresponding to the respective network prefixes using an AAC (Address Auto-Configuration) mechanism and sets them to the respective virtual interfaces L1-L6. In other words, if the lower-order 64-bits corresponding to the HOST are "02:90:27:ff:fe:17:fc:0f", the global IPv6 addresses set to the virtual interfaces L1-L6 corresponding to the HOST are as shown in FIG. 10.

FIG. 10 is an exemplary view showing the six global addresses set to the six virtual interfaces L1-L6 corresponding to the HOST.

Referring now to FIG. 10, the virtual interface L1 having a network prefix "3ffe:2e01:2:1::/64" corresponds to a global IPv6 address "3ffe:2e01:2:1:02:90:27:ff:fe:17:fc:0f". The virtual interface L2 having a network prefix "3ffe:2e01:2:2::/64" corresponds to a global IPv6 address "3ffe:2e01:2:2:02:90:27:ff:fe:17:fc:0f". The virtual interface L3 having a network prefix "3ffe:2e01:2:3::/64" corresponds to a global IPv6 address "3ffe:2e01:2:3:02:90:27:ff:fe:17:fc:0f". The virtual interface L4 having a network prefix "3ffe:2e01:2:4::/64" corresponds to a global IPv6 address "3ffe:2e01:2:4:02:90:27:ff:fe:17:fc:0f". The virtual interface L5 having a network prefix "3ffe:2e01:2:5::/64" corresponds to a global IPv6 address "3ffe:2e01:2:5:02:90:27:ff:fe:17:fc:0f". The virtual interface L6 having a network prefix "3ffe:2e01:2:6::/64" corresponds to a global IPv6 address "3ffe:2e01:2:6:02:90:27:ff:fe:17:fc:0f".

The present invention employs a modified IPv6 stack accommodating a multi-homed host to effectively select a source address and employs a label to effectively process an extension packet header due to a 128-bit address length. Further, to reduce network load due to periodic transmission of an RA message containing a 64-bit network, a new option is defined and a router advertises the network prefix only when the host requests an RS message to the router. In other cases, the router reduces the size of a packet by carrying a short label representing the network prefix within the RA message and transmitting the RA message containing the label to the host, on condition that network prefix information has already been known to the host. In this embodiment of the present invention, the label is defined in an IPv6 packet header and employs a 20-bit flow label field.

Figure 1:
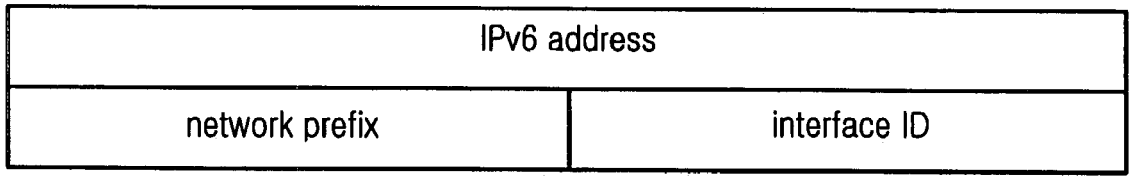
FIG. 1 is a view showing a configuration of an IPv6 address.
Figure 2:
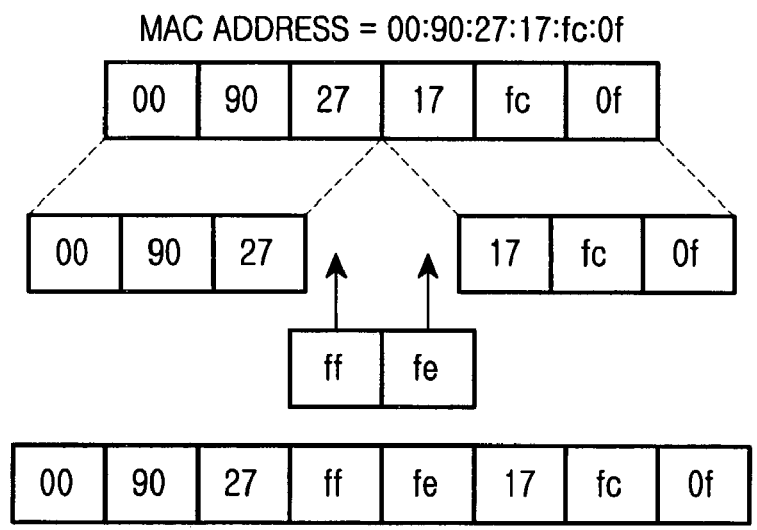
FIG. 2 is a view explaining an address auto-configuration procedure.
Figure 3:
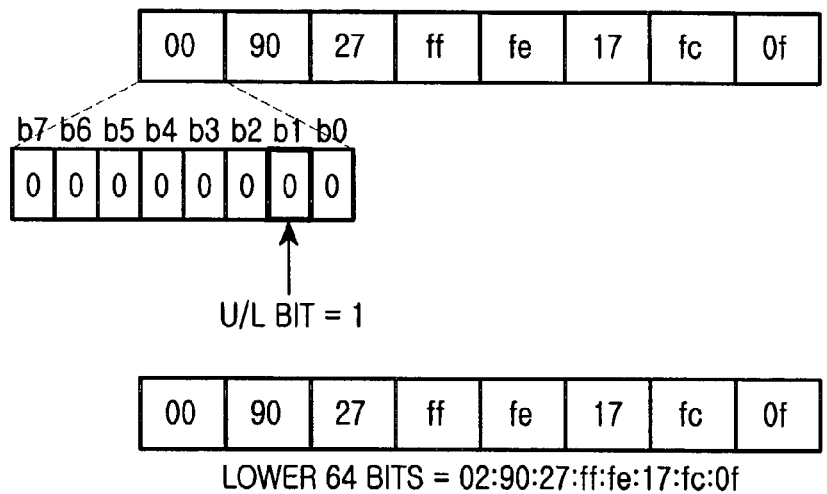
FIG. 3 is a view showing a configuration of a lower-order 64-bit global IPv6 address.
Figure 4:
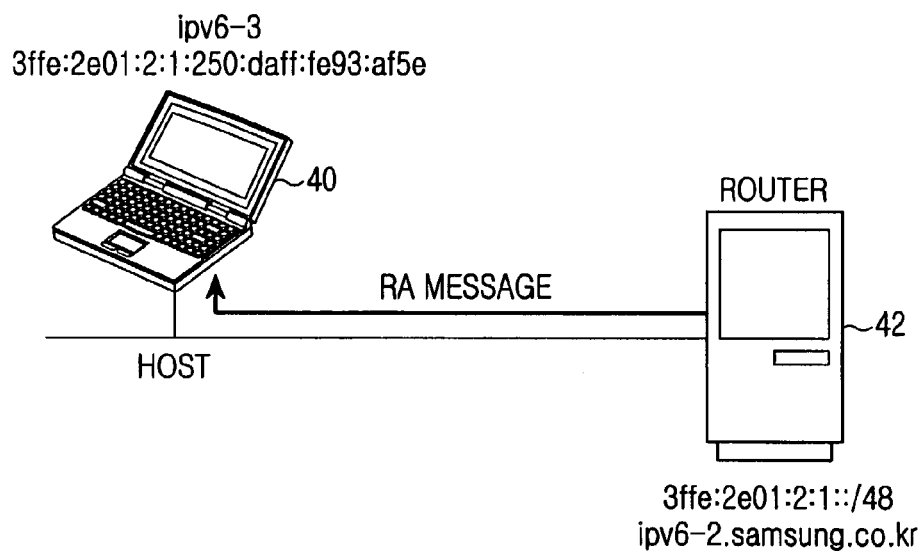
FIG. 4 is an exemplary view showing an address auto-configuration procedure based on IPv6.
Figure 5:
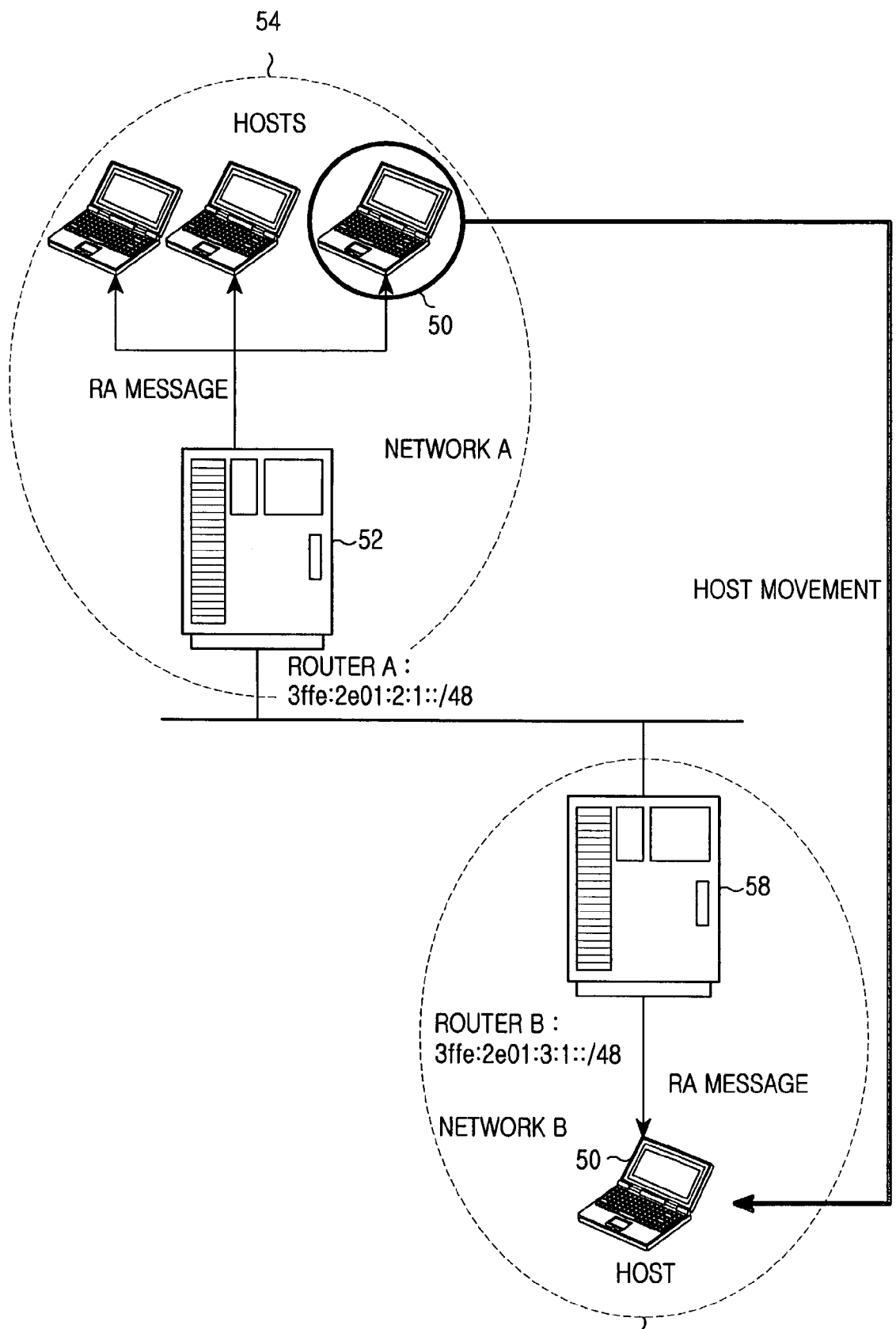
FIG. 5 is a view explaining a global address acquirement based on IPv6.

The host creates and manages a prefix information table shown in FIG. 11 in order to accommodate the characteristics of the present invention described above. A label (router_label), an interface ID (interface_id) and lifetime information are stored in the prefix information table illustrated in FIG. 1. The label (router_label) is received from the router. The ID (interface_id) has a global IPv6 address configured by a network prefix of a corresponding label. The lifetime information indicates the lifetime of the label. The ID (interface_id) defined in the prefix information table indicates an outgoing link corresponding to a global IPv6 address configured by an IPv6 host (node) rather than a physical interface. After the router defines the label with a newly generated random number, it incorporates the label within a flow label field of an IPv6 packet and transmits the label to the host connected to a network of the router.

Figure 14:
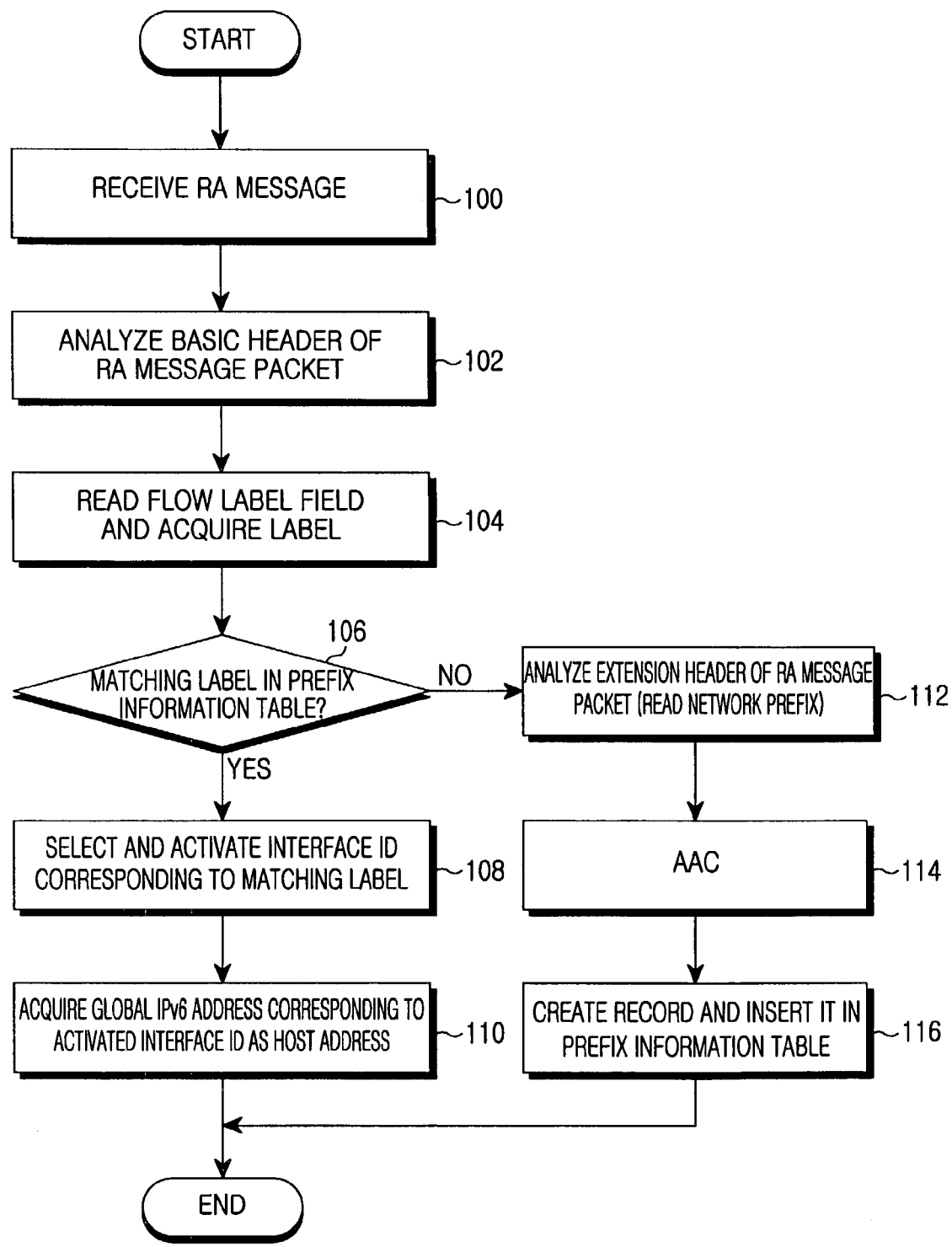
FIG. 14 is a control flow showing a configuration of a global IPv6 address in a host in accordance with an embodiment of the present invention.

If the HOST receives the RA message from the router, it performs a control operation, as shown in FIG. 14. FIG. 14 is a control flow showing a configuration of a global IPv6 address in a host in accordance with an embodiment of the present invention.

Referring to FIG. 14, if a host receives an RA message from a router at step 100 of FIG. 14, it analyzes the basic header of the IPv6 packet containing the RA message at step 102. The host acquires a label by reading the flow label field contained in the basic header at step 104. Thereafter, the host determines at step 106 of FIG. 14 whether a label matching the acquired label exists in the prefix information table contained in the host. If a label matching the acquired label exists in the prefix information table of the host, the host proceeds to step 108 of FIG. 14. The host selects and activates an interface ID corresponding to the matching label in the prefix information table. Then, the host acquires a global IPv6 address corresponding to the activated interface ID as a source address being its own global IPv6 address. In this case, the host can improve the efficiency of the packet processing by reading only header information contained in the packet and ignoring the RA message.

If a label matching the acquired label does not exist in the prefix information table of the host at step 106 of FIG. 14, the host proceeds to step 112 of FIG. 14. The host acquires network prefix information by reading the RA option part contained in the packet. Thereafter, the host proceeds to step 114 of FIG. 14. The host configures its own global IPv6 address using an AAC mechanism by which an existing mobile IPv6 configures a global IPv6 address. Finally, the host creates a record associated with a new global IPv6 address and inserts (registers) the created record in the prefix information table at step 116 of FIG. 14.

FIG. 17 is an exemplary view showing a format of an IPv6 packet associated with the RA message described in connection with FIG. 14. As shown in FIG. 17, the RA message uses a type "134" of an ICMP (Internet Control Message Protocol) message. In other words, the type "134" of the ICMP message among ICMP messages having a type "58" of a next header in IPv6 packets indicates the RA message. Among options of the RA message, network prefix information is inserted in a "prefix information option (option type 3)" and transmitted.

In accordance with the embodiment of the present invention, label creation, labeling, label transmission and a prefix information table are described below in detail.

1. Label Creation and Labeling

Where a label-switching scheme such as an MPLS (Multi Protocol Label Switching) is employed, the amount of information retained in order to create and manage unduplicated labels increases. After all cases of paths are identified in advance, the label-switching scheme employs a hardware packet transmission scheme because the same information on an overall network for the label to be used should be retained. In the embodiment of the present invention, the label is created and managed in software using only an existing IPv6 without using additional equipment and an additional protocol. In particular, to increase the efficiency of the label creation and management in the embodiment of the present invention, a router creates the label using a random number generator. IPv6 has a flow label creation. However, the flow label creation function creates a flow label through a detailed process. Accordingly, the flow label creation function in IPv6 is not appropriate for achieving the object of the present invention for minimizing overhead. Further, where the length of the label is shorter, the probability of label duplication is high. In the embodiment of the present invention, a 10-bit length label is preferably employed.

2. Label Transmission

A label is inserted in the flow label field of an IPv6 header by a router and transmitted to a host. The flow label field is defined as 20 bits for QoS (Quality of Service). The flow label field is an experimental field and is not currently used. Methods for using the flow label field are currently being researched. In the embodiment of the present invention, a defined flow label field having an occupied space is used. Accordingly, an additional format for a packet containing the label and additional option information containing the label in an existing header format do not have to be defined.

3. Configuration of Prefix Information Table

A prefix information table stored in a host is shown in FIG. 11. The prefix information table is made up of a label field having a label (router_label) received from a router, an interface ID field having a global IPv6 address composed of a network prefix (prefix or router_prefix) and reception information, and a lifetime field storing the lifetime of corresponding information.

The creation and management of each field in the prefix information table is now described with reference to FIGS. 12 and 13. The value of the lifetime field of the prefix information table is initialized to a router lifetime value contained in an RA message by a host. Further, a record corresponding to a lifetime field value being "0" is deleted from the prefix information table. This case means that the probability of a network re-visitation for a predetermined time period is low. The reason why the probability of the network re-visitation is low is because the lifetime field value is updated to the router lifetime value contained in the RA message recently received if a record for a previously visited network exists in the prefix information table and the network is revisited within the predetermined time period. Thereafter, when the host searches the prefix information table, a record of a long lifetime has a high priority. Accordingly, the host searches the prefix information table to check for a label match on the basis of the priority.

The creation and management of the prefix information table is now described in detail with reference to FIG. 9. The HOST receives router labels, interface IDs and lifetime information contained in RA messages from its circumferential six routers. For example, the router labels, the interface IDs and the lifetime information stored in the prefix information table are shown in FIG. 13. The number of records in the embodiment of the present invention is limited to the predetermined maximum number of records so that search overhead is not caused by an infinite increase in the size of the prefix information table. Further, when the prefix information table is searched, it is possible for hardware to implement a high-speed search. The reason why the hardware support is needed for the high-speed search of the prefix information table is as follows. The managing and searching of many records in the prefix information table is limited by overhead considerations when accomplished by software. In other words, because a waste of system resources can be caused when the prefix information table is searched by software, the high-speed search of the prefix information table is supported by a high-speed memory in the embodiment of the present invention. The maximum number of records which can be accommodated by high-speed search of the prefix information table by the hardware is implementation hardware dependent.

In accordance with the embodiment of the present invention, creation and deletion of a record and acquisition of the value of a lifetime field in the prefix information table implemented in the host is now described.

Record Creation and Deletion

The host reads the label of a packet received from a router and determines whether there is a label (router_label) matching the received label within the prefix information table of the host.

Creation: if there is no label (router_label) matching the received label within the prefix information table of the host, the host creates a record corresponding to the received label and inserts the created record into the prefix information table.

Deletion: the host deletes a record from the prefix information table in the two cases described below. One case is when a lifetime field value is "0". Another case is when the number of records has already reached the maximum number of records and the host then tries to insert a new record. In these two cases, the host deletes a record corresponding to the lowest lifetime value.

Acquisition of a Record's Lifetime

A router lifetime contained in an IPv6 router RA message is indicated in units of seconds. The maximum value of the router lifetime that can be designated is 18.2 hours. A router lifetime of "0" indicates that the corresponding network prefix is no longer valid. The host acquires the lifetime value by copying a router lifetime value of the router RA message in a lifetime field of the prefix information table.

4. Global IPv6 Address Setting

The global IPv6 address setting procedure has been described above with reference to FIG. 14. In addition to this, the global IPv6 address setting procedure is now described below. In the embodiment of the present invention, a host needs to accomplish the three steps described below to set a global IPv6 address. In the first step, the host acquires a label from an RA message transmitted by a router. In the second step, the host searches the "router_label" field of its prefix information table and returns an "interface_id" field value of a corresponding record if there is a label matching the acquired label in the "router_label" field. In the third step, the host activates an interface corresponding to the returned "interface_id" field value. These steps are now described below in detail.

Prefix Information Table Search

The prefix information table search by the host is simply accomplished by identifying whether the label received from the router matches a label of the "router_label" field in the prefix information table. If there is no label being matching the received label in the prefix information table, the host reads prefix information from the RA message and configures a new global IPv6 address in an existing manner. After configuring the new global IPv6 address, the host sets the address to an interface of a node and adds the new address information into the prefix information table.

Interface Selection

After comparing the interface ID from a search of the prefix information table with interface IDs currently set to the host if there is a matching interface ID, the host selects the correspond interface.

Interface Activation

After selecting the corresponding interface, the host activates the corresponding interface and deactivates other interfaces.

5. Modified RA and RS Messages

In the current IPv6, a router periodically transmits RA messages to its own network. The host does not wait until receiving an RA message and can first transmit an RS message. Because an extension header increases the size of an IPv6 packet and the RA message includes 64-bit network prefix option data, it may increase network load. Accordingly, in the embodiment of the present invention, one bit of label option information is added into the RA and RS messages. The router only transmits a label when the label option bit of the RS message is a "1". Further, the router transmits a network prefix itself when the label option bit of the RS message indicates "0". In other words, where the host sets the label option bit of the RS message to "1" and transmits it to the router, the router sets the label option bit to "1" and advertises a packet having only the label instead of the network prefix when transmitting the RA message. Further, where the host sets the label option bit of the RS message to "0" and transmits it to the router, the router sets the label option bit to "0" and advertises a packet having the network prefix when transmitting the RA message. Thus, the size of the packet corresponding to the periodically transmitted RA message is reduced.

Figure 15:
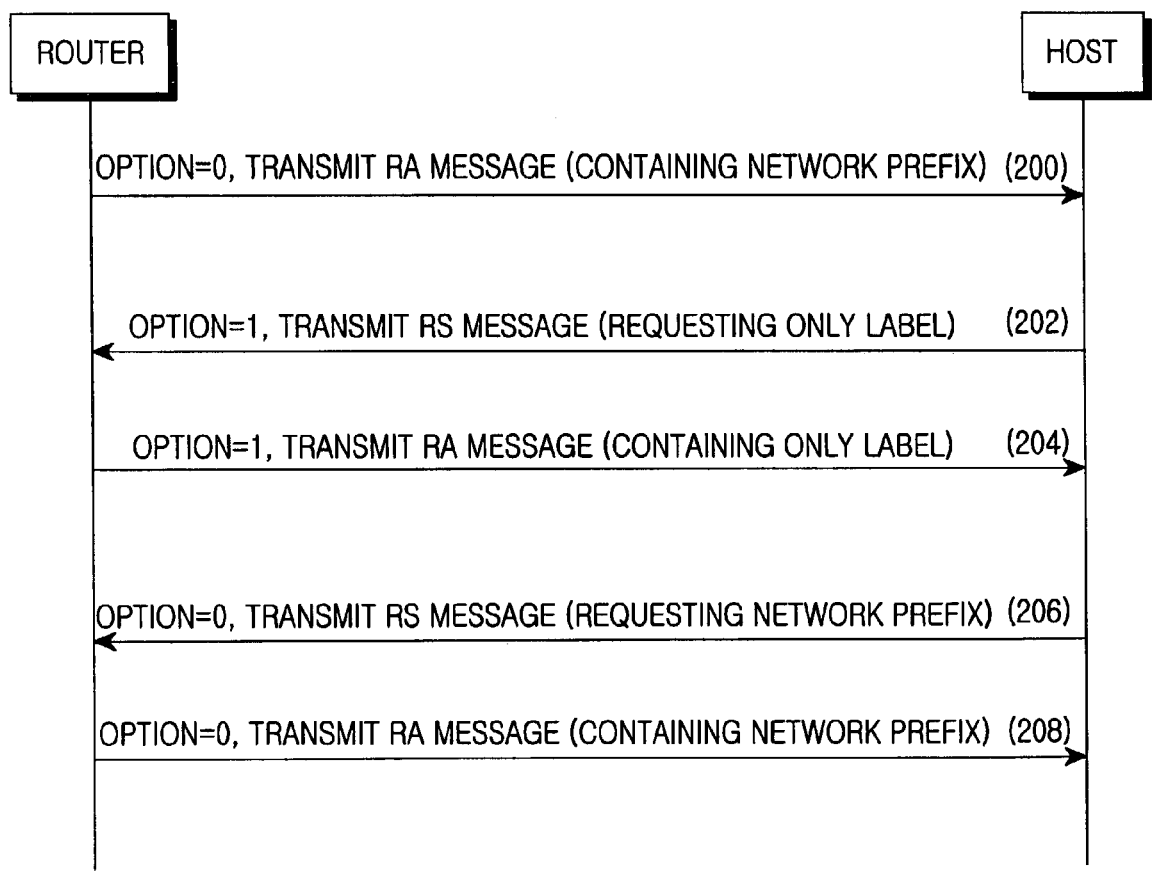
FIG. 15 is a view showing a communication protocol between a host and a router in accordance with another embodiment of the present invention.

FIG. 15 is a view showing a modified communication protocol between a host and a router in accordance with another embodiment of the present invention which involves only modifications to RA and RS messages.

Figure 16:
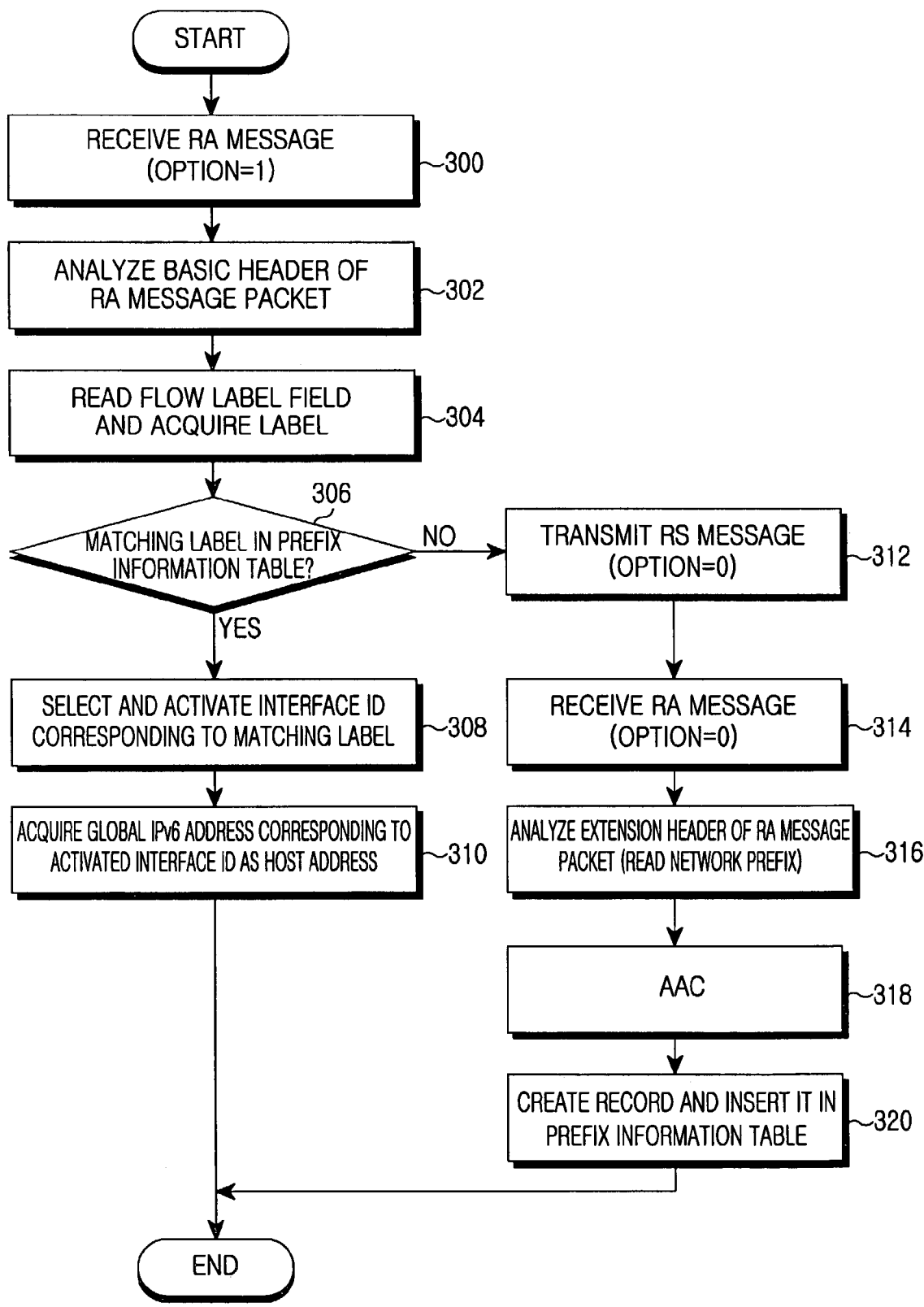
FIG. 16 is a control flow showing a configuration of a global IPv6 address in accordance with another embodiment of the present invention.

FIG. 16 is a control flow showing a configuration of a global IPv6 address in accordance with another embodiment of the present invention.

First, the communication protocol of FIG. 15 is discussed.

The router periodically transmits the RA message containing the network prefix and the label option bit of "0" to the host connected to the router's network at step 200 of FIG. 15. At this time, if it is assumed that the host resides on a corresponding network for a long time, the host does not have to receive network prefix information already being used from the RA message. Therefore, the host requests the RA message containing only the label without containing the network prefix information by setting the label option bit to "1" and transmitting the RS message at step 202 of FIG. 15. In response to the request, the router periodically transmits the RA message containing the label option bit of "1" without the network prefix information to the host at step 204 of FIG. 15. Step 206 of FIG. 15 corresponds to the case that the prefix information of the network to which the host belongs has been deleted or the host visits the network for the first time. Further, the above step 206 corresponds to the case in which the host revisits the network after residing on another network and simultaneously a record associated with a lifetime of "0" has been deleted from the prefix information table. At this time, because the host needs the prefix information of the network to which the host belongs, it requests the RA message containing the network prefix information from the router by transmitting the RS message containing the label option bit of "0". As a result, the router transmits the RA message containing the network prefix information and the label option bit of "0" to the host.

Next, referring to FIG. 16, the global IPv6 address configuration by the host described in connection with FIG. 15 is described from the host's point of view.

The router sets the label option bit to "1" and periodically transmits the RA message to its own network. At this time, the RA message contains a label in a flow label field and does not contain network prefix information in an extension header. Accordingly, if the host receives the RA message containing the label option bit of "1" at step 300 of FIG. 16, it first analyzes a basic header of an IPv6 packet containing the RA message at step 302 of FIG. 16. The host acquires the label by reading the flow label field and the label option bit contained in the basic header at step 304. Thereafter, the host determines at step 306 of FIG. 16 whether the acquired label exists in the prefix information table of the host. If the acquired label exists in the prefix information table of the host, the host proceeds to step 308 of FIG. 16. The host selects and activates an interface ID corresponding to the acquired label at step 308. The host acquires a global IPv6 address corresponding to the interface ID as a source address equal to the global IPv6 address of the host at step 310 of FIG. 16. In this case, the host reads only the basic header of the IPv6 packet and ignores a next header of the RA message, thereby improving the efficiency of packet processing.

If the acquired label does not exist in the prefix information table contained in the host at step 306 of FIG. 16, the host proceeds to step 312 of FIG. 16. The host transmits the RS message to the router in order to request an RA message containing the network prefix information. At this time, the label option bit is set to "0". The host receives the RA message in response to the RS message at step 314 of FIG. 16. The received RA message contains the label option bit set to "0" and the requested network prefix information. Thereafter, the host proceeds to step 318 of FIG. 16. The host configures its own global IPv6 address using an AAC mechanism with which an existing mobile IPv6 configures the global IPv6 address. Finally, the host creates a record associated with a new global IPv6 address and inserts (registers) the created record into the prefix information table at step 320 of FIG. 16.

It should be appreciated that the suggested modified RA and RS messages can be alternatively applied to the embodiment of the present invention. In the embodiment of the present invention, it is intended that the suggested modified RA and RS messages reduce the number of packets to be periodically transmitted over the network. In other words, if it is assumed that the host always moves on an adjacent network according to a similar pattern, the host is able to acquire a global IPv6 address using only the label of the RA message because the probability of re-visitation of a previously visited network is high. Therefore, the RA message to be periodically transmitted contains only the label and omits the prefix information of the extension header, thereby greatly reducing a size of a packet. Only when the network is visited for the first time does the host first designate the label option bit to "0" to request the network prefix and transmit the RS message to the router, thereby acquiring the network prefix.

The effects in accordance with the present invention are as follows. Because mobility is supported but host mobility is not considered conventionally, there is a problem in that a host or network overhead can increased. For this reason, a host stores network information in a table when it visits a network once and acquires necessary information from the table when it revisits the network so that host mobility can be maximally supported in the present invention. In other words, introducing a multi-homed host concept in the present invention can minimize the time needed to set a global IPv6 address. Further, additionally introducing a label concept in the present invention can prevent additional packet creation. When the packet is received, only the label is read and an RA option part of an extension header is ignored, thereby improving the efficiency of packet processing. Where several global IPv6 addresses are conventionally assigned to one physical interface through an alias, there is another problem that a source address selection is confused when different hosts communicate with each other. For this reason, a single interface is activated, to which an address composed of a network prefix is set, thereby solving the problem relating to the source address selection in the present invention. Accordingly, the overhead due to the host address setting or the source address selection can be minimized and the new option of RA and RS messages of the present invention can minimize network loading.

Although the preferred embodiments of the present invention have been disclosed for illustrative purposes, those skilled in the art will appreciate that various modifications, additions and substitutions are possible, without departing from the scope of the present invention. Therefore, the present invention is not limited to the above-described embodiments, but the present invention is defined by the claims which follow, along with their full scope of equivalents.

What is claimed is:

1. A method for selecting a source address in an Internet protocol based communication system, comprising the steps of:
   a) creating virtual interfaces corresponding to network prefixes received by a host connected to from routers included in the respective;
   b) setting addresses directed to the networks corresponding to the created virtual interfaces; and
   c) comparing by the host a prefix of a destination address to the prefixes of the created virtual interfaces and selecting a virtual interface address corresponding to a prefix having a longest match as a basic address.

2. A method for selecting a source address in an Internet protocol based communication system, comprising the steps of:
   a) designating areas near a host as a plurality of virtual cells and placing a router for transmitting and managing network information within each virtual cell;
   b) visiting the plurality of virtual cells by the host to receive network prefixes for the plurality of virtual cells from routers and labeling the network prefixes to configure a table;
   c) setting, by the host, global IPv6 (Internet Protocol, version 6) addresses corresponding to the network prefixes; and
   d) selecting, by the host, an interface having a corresponding the global IPv6 addresses with respect to the virtual cell being the previously visited network.

3. A method for setting a host address in an Internet protocol based communication system, comprising the steps of:
   a) a router creating a shorter label than a network prefix, the label being representative of the network prefix;
   b) the router transmitting an RA (Router Advertisement) message to a host that incorporates the label instead of the network;
   c) a host that receives the RA message reading the label to determine whether the read label matches a label in a prefix information table of the host;
   d) if the read label matches a label in the prefix information table, the host activating an interface ID (identifier) corresponding to the label of the prefix information table; and
   e) the host acquiring a global IPv6 (Internet Protocol, version 6) address corresponding to the activated interface ID as the host address.

4. The method as set forth in claim 3, further comprising the steps of:
   f) if there is no matching label, configuring the global IPv6 address through an AAC (Address Auto-Configuration) mechanism by analysis of an extension header of the RA message to read network prefix information; and
   g) newly registering a record associated with the configured global IPv6 address in the prefix information table.

5. The method as set forth in claim 3, wherein the label is created by the router using a random number generator.

6. The method as set forth in claim 3, wherein the label is defined in an IPv6 packet header but contained in an unused 20-bit flow label field thereof.

7. The method as set forth in claim 6, wherein the label is of a 10-bit length.

8. The method as set forth in claim 3, wherein the prefix information table comprises the label received from the router, an interface ID to which the global IPv6 address composed of the network prefix of the corresponding label is set, and lifetime information indicating a lifetime of the label.

9. A method for setting a host address in an Internet protocol based communication system, comprising the steps of:
   a) a router periodically transmitting an RA (Router Advertisement) message containing network prefix information to a host connected by a network to the router;
   b) in response to a request by the host to transmit the RA message containing only a label without the network prefix information, the router creating a shorter label than a network prefix, the label being representative of the network prefix, such that the router incorporates the label instead of the network prefix in the RA message and transmits the RA message to the host;
   c) the host receiving the RA message reading the label to determine whether the read label matches a label in a prefix information table of the host; and
   d) if the read label matches a label in the prefix information table, the host activating by an interface ID (identifier) corresponding to the read label of the prefix information table; and
   e) the host acquiring a global IPv6 (Internet Protocol, version 6) address corresponding to the activated interface ID as the host address.

10. An Internet protocol based communication system, comprising:

a plurality of routers for managing networks and advertising a network prefix of a corresponding network being managed; and a host for receiving network prefixes from the routers of the networks, creating virtual interfaces corresponding to the network prefixes, setting addresses directed to the networks corresponding to the created virtual interfaces and selecting an address appropriate to a destination among the set addresses.

* * * * *